United States Patent Office 2,998,739
Patented Sept. 5, 1961

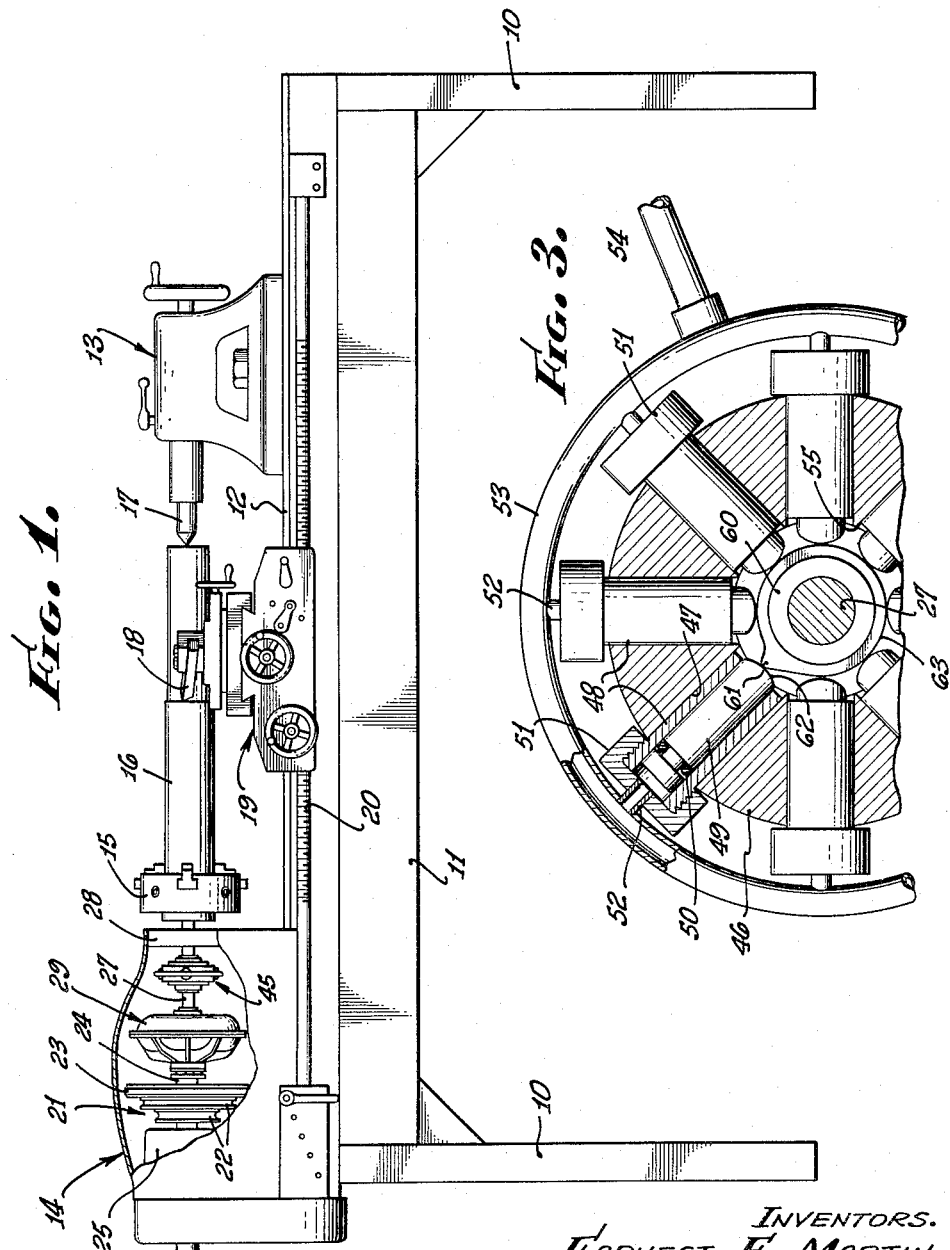

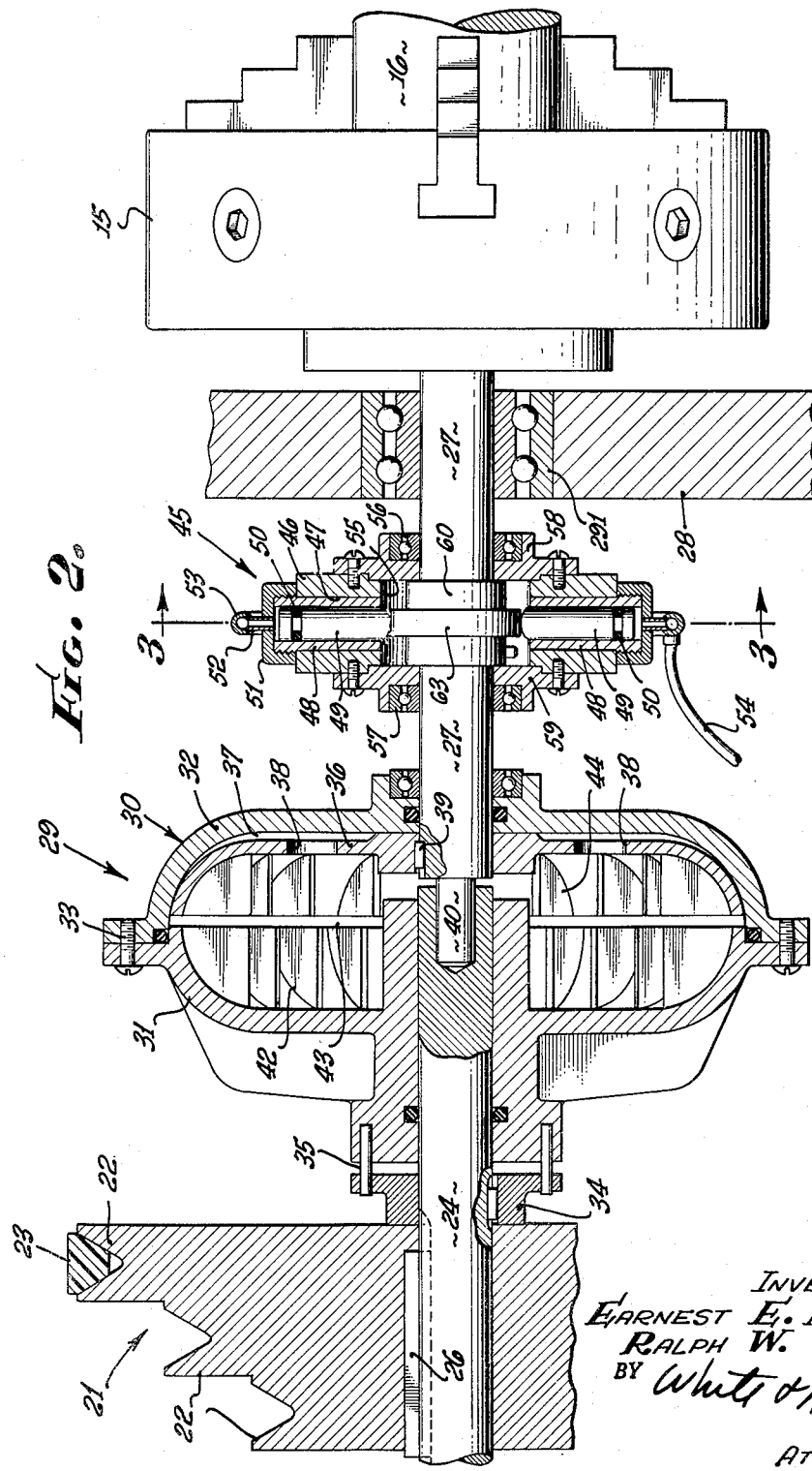

2,998,739
METHOD AND APPARATUS FOR CUTTING
ROTARY WORK METAL
Earnest E. Martin, Glendora, Calif., and Ralph W. Walsh, 14352 Huntington Beach Blvd., Westminster, Calif.; said Martin assignor to said Walsh
Filed July 6, 1959, Ser. No. 825,266
4 Claims. (Cl. 82—28)

This invention relates generally to improvements in method and apparatus for metal cutting employing tools such as lathe cutting tools for cutting away rotary work metal, either ferrous or non-ferrous, and alloys thereof, and of which all various kinds of steel, non-ferrous metals such as aluminum, manganese, copper, titanium and their alloys, are illustrative.

More particularly, the invention is directed to the solution of major problems arising because of the cutting action of the tool and which in the usual past practices have been responsible for certain undesirable cutting effects on the metal as well as adverse effects on the tool itself. One of these problems has been the inability in practical commercial operations to cut away various metals e.g. stainless and other steels without forming and leaving work metal laid-back adjacent the cutting tool and without customary heating of the tool that lessens its efficiency and life. The present invention affords a practical solution of these as well as other related problems, in being productive of a cutting action of the tool that eliminates such work metal lay-back, preserves accuracy of cutting, greatly facilitates the cutting of certain "difficult to cut" metals, and maintains the tool in a cool condition that obviates the disadvantages to the work and tool that are caused by excessive heating. Because of the importance of being able to cut work on a lathe under such conditions to the elimination of tool heating and the facilitation of cutting ease, the invention will be described typically as applied to that particular objective.

In ordinary lathe cutting or turning, the tool cuts into rotary work metal that is rotated by a drive (e.g. from a constant speed motor through the customary speed reduction) which requires during the cutting operation constant speed rotation of the work under constant drive force. Thus, the cutting edge of the tool is given no alternative against following unyieldingly a rotary cutting path relative to the work dictated in part by forced advancement of the work against the tool, the latter usually being advanced or fed parallel to the work axis of rotation. The result is formation of relatively extended segmental spiral cuttings corresponding to extended continuous cutting penetration of the rotary work metal by the tool. The heat generated being a function of the extent and continuity of cutting, the tool thus becomes subjected to temperatures which often necessitate fluid cooling of the tool. A further incident of the manner in which the tool cuts and of the kind and extent of the cuttings formed, is the tendency of the tool to leave or lay back work metal edges, which for many manufacturers, particularly in the precision category cannot be tolerated.

In avoiding tool heating and work metal edge layback, and in facilitating ease of lathe turning of otherwise difficult to cut metal, we depart from the customary methods of powering the work in respects partly characterized in terms of end result, by the action and combined effect of the rotary work and tool to produce comminuted small powdery or flaky cuttings as distinguished from spiral shavings or segments. While all the reasons underlying the formation of our fine, flaky cuttings are not fully understood, they apparently result from either or a combination of two principal conditions to which the work is subjected, the first being maintenance of such rotational lost motion or slippage in the work drive as will give the work rotationally cushioned or yielding approach to the tool. The second condition comprises a torque or rotational impulsing of the work while holding it against axial retraction and also against retraction away from the tool.

As applied to forms of lathe type equipment comprising the combination of a rotatable power source drive including a power shaft generally extending horizontally, a spindle extending axially of the power shaft and a work holder or chuck carried by the spindle, the invention contemplates creating in the drive, as between the power end of the spindle and the chuck end thereof, a capacity for slippage that will result in rotation of the work at speeds sufficiently slower than the power source to afford a full range of necessary cushioned or yielding penetration of the rotary work against the tool and this same range may be such as to facilitate use or creation to best advantage of torque impulses to the work.

A further important object of the invention is to impart to rotary work held in a lathe a cushioned or yielding action by the transmission of the drive through a fluid medium in which slippage occurs, thus rendering the work rotation impositive in accordance with the slippage. With respect to imparting torque pulses to the work, the invention contemplates the creation of such impulses within or in direct relation to the fluid transmission, or independently thereof.

Thus, we may employ a fluid coupling so designed so as to create and transmit to the driven element and work, rotative pulsations or the pulsing may be applied to the driven element extraneously of the fluid coupling proper. All the features and objects of the invention, as well as the details of certain illustrative embodiments, will be fully understood and explained to better advantage in the following description of the accompanying drawings, in which:

FIG. 1 is a side elevation partly broken away showing a typical apparatus embodiment of the invention in the form of a lathe;

FIG. 2 is an enlarged cross sectional view showing certain of the driving and driven parts of the apparatus appearing in FIG. 1; and FIG. 3 is a fragmentary section taken on line 3—3 of FIG. 2;

It is to be understood that apparatus adapted to serve the objects and purposes of the invention discussed in the foregoing may take various specific forms, and that the showing herein of the general aspects of a conventional lathe, but modified and altered to function in accordance with the invention, is to be regarded as illustrative only.

Referring to FIG. 1, the invention is shown to be embodied typically in a conventional lathe assembly comprising the usual posts or standards 10 carrying the horizontal table 11 supporting a bed 12, the latter in turn supporting a tail stock assembly 13 which is shiftable along the bed. The table 11 also supports a power head assembly 14 for driving a work chuck 15 supporting work 16 at one end thereof, the opposite end of the work being supported by the tail stock center 17, all for the purposes of allowing work rotation by the chuck. A cutting tool 18 is shown as supported by a carriage 19 which may be fed along the bed by means of a lead screw 20.

Referring to the power head 14, it is shown typically to include a step-cone pulley-drive 21, including differential size pulleys or sheaves 22 for selectively driving through a belt 23 a shaft 24, so that shaft 24 may be driven at different speeds. A reverse arrangement of sheaves, not shown, is also included in the step-cone drive 21 for engagement with the belt 23. Power is supplied from an electric motor, not shown, through a gear box 25. The sheave assembly 22 is shown in FIG. 2 to be splined at 26 to the power shaft 24, so that the latter may be positively rotated in accordance with the selected speed transmitted through the belt 23.

The work rotating chuck 15 is shown in FIG. 2 as being carried on a spindle 27 journaled in a support 28 as by means of roller bearing 291. Spindle 27 is driven by the power shaft 24 through a lost motion coupling generally indicated at 29, the characterized "lost motion" being given the coupling in that it permits 360° slippage in the drive and causes working rotation of the spindle at a slower speed than the drive within a range of speed differential allowing variations or impulsing of the rotating work as it advances against the cutting tool. Otherwise regarded, the coupling 29 so cushions the drive transmission to the work as to permit a yield in the rotational driving force that will enable the tool, in effect, to have a degree of yield in its cutting advancement in the metal, while the tool is held against retraction from its cutting path relative to the work.

Highly satisfactory results have been achieved by the employment of a fluid coupling at 29 shown typically to comprise a housing 30 having right and left sections 31 and 32 interconnected at 33, the left section being attached to the power shaft 24 through a sleeve 34 keyed to the power shaft and dowel-connected to the housing section 31 at 35. The right section 32 of the housing contains a dished rotor having clearance at 37 from the housing and containing openings 38 which permit oil or other hydraulic fluid contained within the housing to occupy the clearance at 37 as well as the inside of the rotor to a degree depending upon the quantity of fluid used, frictional force acting to throw the fluid into the space between the dished rotor 36 and the housing section 32. In this connection it will be understood that the shaft 24 and spindle 27 typically extend in a common horizontal axis of rotation, that axis being also common with the axis of rotation of the dished rotor and the housing.

The rotor 36 is keyed to the spindle 27 at 39, the spindle having an extension 40 which pilots in a bore 41 of the power shaft 24. Thus, rotative drive is transmitted from the power shaft 24 to the housing 30 and thence frictionally through the fluid contained in the housing to the rotor 36 and the spindle 27.

The left section 31 of the housing may contain a circular arrangement of uniformly spaced vanes 42 having narrow, variable clearance at 43 from similar radial vanes 44 in the rotor 36. The housing and rotor vanes may correspond in number and uniform spacing, or they may vary relatively in number. We have used satisfactorily a coupling assembly as shown in which the housing contains 18 vanes 42 and the rotor 19 vanes 44.

In actual practice, we have obtained satisfactory results by so governing the operation of the fluid coupling as to maintain during drilling a spindle speed of around 80% of the rotating speed of the power shaft 24. Depending upon particular conditions of cutting or turning of work metal, the relative spindle speed may range typically between 70 to 90% of the power shaft speed. Governing of the relative speeds, which are infinitely variable within that range because of progressive slippage in the coupling may be effected in accordance with the quantity of hydraulic fluid put into the coupling in relation to the speed of the drive shaft 24. Thus, the drive speeds within the range of from 18 to 4800 r.p.m., we may use between about 1½ and 7 oz. of hydraulic fluid, the lesser quantity being used at the higher drive speeds. As will be understood, the drive transmission occurs by reason of frictional transmission through the fluid within the clearance space 37 and particularly as the fluid is centrifugally thrown outwardly into the annularly narrowing clearance, and additionally where the quantity of hydraulic fluid is sufficient to occupy at least some of the vane clearance at 43, by reason of the fluid frictional transmission at this location. It is contemplated that the effect or relation of the vanes may be such as to cause creation and transmission through the housing to the spindle of rotationally pulsing effects as the vanes pass each other. As will appear, it is also contemplated that the pulse effects may be obtained additionally or otherwise and independently of any pulsing effects created by relative passage of the vanes.

In FIGS. 2 and 3, there is illustrated a variational method and means for rotationally impulsing the work through the header 15 and spindle 27, in this instance by imposing intermittently and mechanically applied restraint to the spindle rotation by means of the detenting mechanism generally indicated at 45. The latter is shown to comprise a circular body 46 containing a plurality, typically eight, of radial bores 47 each containing a liner cylinder 48 within which reciprocates a detenting piston 49 carrying a seal ring 50. Each cylinder carries at its outer end a cap 51 through which fluid pressure against the piston is maintained by way of a tubular connection 52 with the manifold 53 maintained constant, though variable, by air pressure communication through connection 54 forming a suitable compressed air supply source, not shown. The body 46 has a central bore 55 through which the spindle 27 extends, the body assembly being held in fixed relation to the spindle axis by the connection 54. The spindle in journaled within bearings 56 and 47 within cover plates 58 and 59 secured to the body 46. Fixed to the spindle within the body bore 55 is a sleeve 60 carrying a cam node 61 engageable as the spindle rotates successively against the rounded inner ends 62 of the plungers 49 to displace each plunger successively and outwardly from its riding engagement with the sleeve surface 63 against the resistance air pressure applied to the outer end of the plunger. Thus, the transient resistances to the spindle rotation resulting from successive displacement of the plungers, tends correspondingly to retard and in effect, impulse the rotation of the work.

By reason of the described conditions imparting an essentially yielding or cushioned drive to the work and within a spindle range below that of the drive shaft 24 permitting flexibility to the work as it encounters the resistance of the tool cutting into the work, the effect is to produce powdery or fine flaky cuttings, formation of which occurs throughout relative turning advancement of the tool through the work metal, so that no metal edges are laid back adjacent the cut away zone. As a further consequence of the discontinuity of the cutting action of the tool, the latter is found to remain cool to the extent of eliminating all temperatures that could be detrimental to the life or efficiency of the tool. Finally, it may again be observed that these results flow from controlling in the manner described, the rotational drive of the work while maintaining steady axial positioning of the work, the tool being fed into the work toward the axis of rotation thereof or fed parallel to that axis, or having a combination of these feeds as desired.

We claim:

1. The method of operating a lathe cutting tool in rotary metal work, that includes forming comminuted chip-like cuttings and a cut-away zone at the work that is free of laid back edges by creating a rotational drive, transmitting the drive through a rotationally yielding medium and at a slower infinitely variable rate to rotate the work axially, creating continuous rotational slippage in said medium throughout 360 degree relative rotation of the drive and work whereby the work during cutting is maintained free for rotational pulsing, locating the tool in the path of the rotating work but at only one side of the work axis of rotation so that the tool cuts into the work at said side only, rotationally impulsing the work, and axially supporting the rotating work independently of the cutting tool.

2. The method of operating a lathe cutting tool in rotary metal work, that includes forming comminuted chip-like cuttings and a cut-away zone at the work that is free of laid back edges by creating a rotational drive, transmitting the drive to the work through a rotationally yielding fluid medium and at a slower infinitely variable rate within a range of about 70% to 90% of the rotational drive speed and so that the work rotates axially, creating continuous rotational slippage in said medium throughout 360 degree relative rotation of the drive and work whereby the work during cutting is maintained free for rotational pulsing, locating the tool in the path of the rotating work but at only one side of the work axis of rotation so that the tool cuts into the work at said side only, rotationally impulsing the work, and axially supporting the rotating work independently of the cutting tool.

3. In lathe type metal cutting apparatus, the combination comprising a rotative power shaft, a spindle, a work holder carried by said spindle, said work holder having an axis and being operable to rotate the work about an extension of said axis, a lathe type cutting tool, a slippage coupling interconnecting said power shaft and spindle for infinitely variable relative rotation within the slippage range whereby the work metal because of slippage in the coupling has yielding approach to the cutting tool, said coupling including means frictionally and constantly transmitting torque to the spindle throughout its revolutions with continuous slippage throughout 360 degree relative rotation between the spindle and power shaft with simultaneous freedom given the spindle and work holder for rotational pulsing, means for imparting torque pulsations to the spindle during rotation thereof, and means positioning the tool at one side only of said axial extensions and in the path of work rotation by said holder to penetrate the work metal at said side only while the work is axially supported for rotation and rotational pulsing.

4. The invention as defined in claim 3 in which said coupling includes an outer body and an inner vaned rotor interconnecting said power shaft and spindle, said coupling being a fluid coupling.

References Cited in the file of this patent

UNITED STATES PATENTS

| | | |
|---|---|---|
| 2,098,214 | Benedek | Nov. 9, 1937 |
| 2,891,425 | Martin et al. | June 23, 1959 |
| 2,891,426 | Martin et al. | June 23, 1959 |